July 13, 1937.                H. A. CENTERVALL                2,086,535
           HYDRAULIC VARIABLE SPEED POWER TRANSMITTING MECHANISM
                     Filed July 11, 1931         5 Sheets-Sheet 5
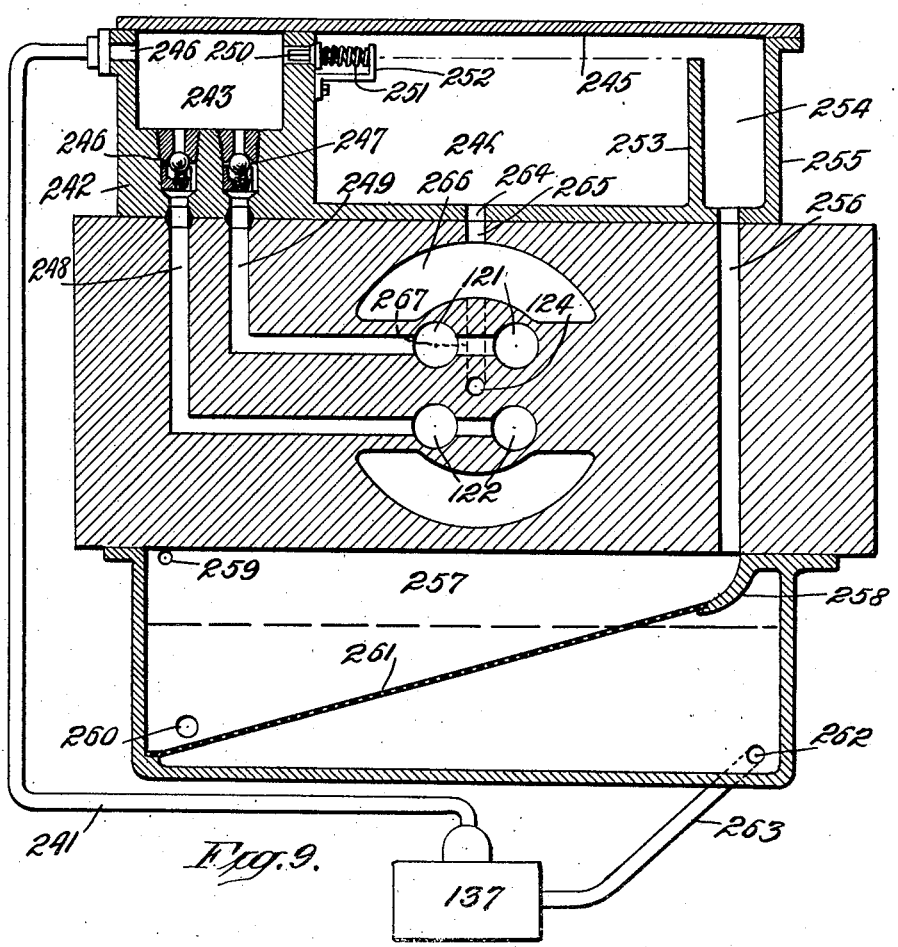
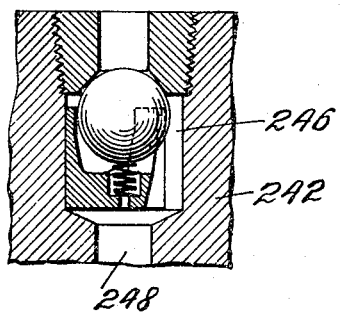
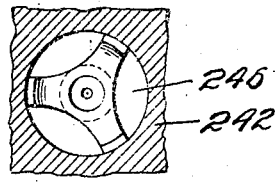
INVENTOR
Hugo A. Centervall
BY
Robert W. Byerly
ATTORNEY Patented July 13, 1937

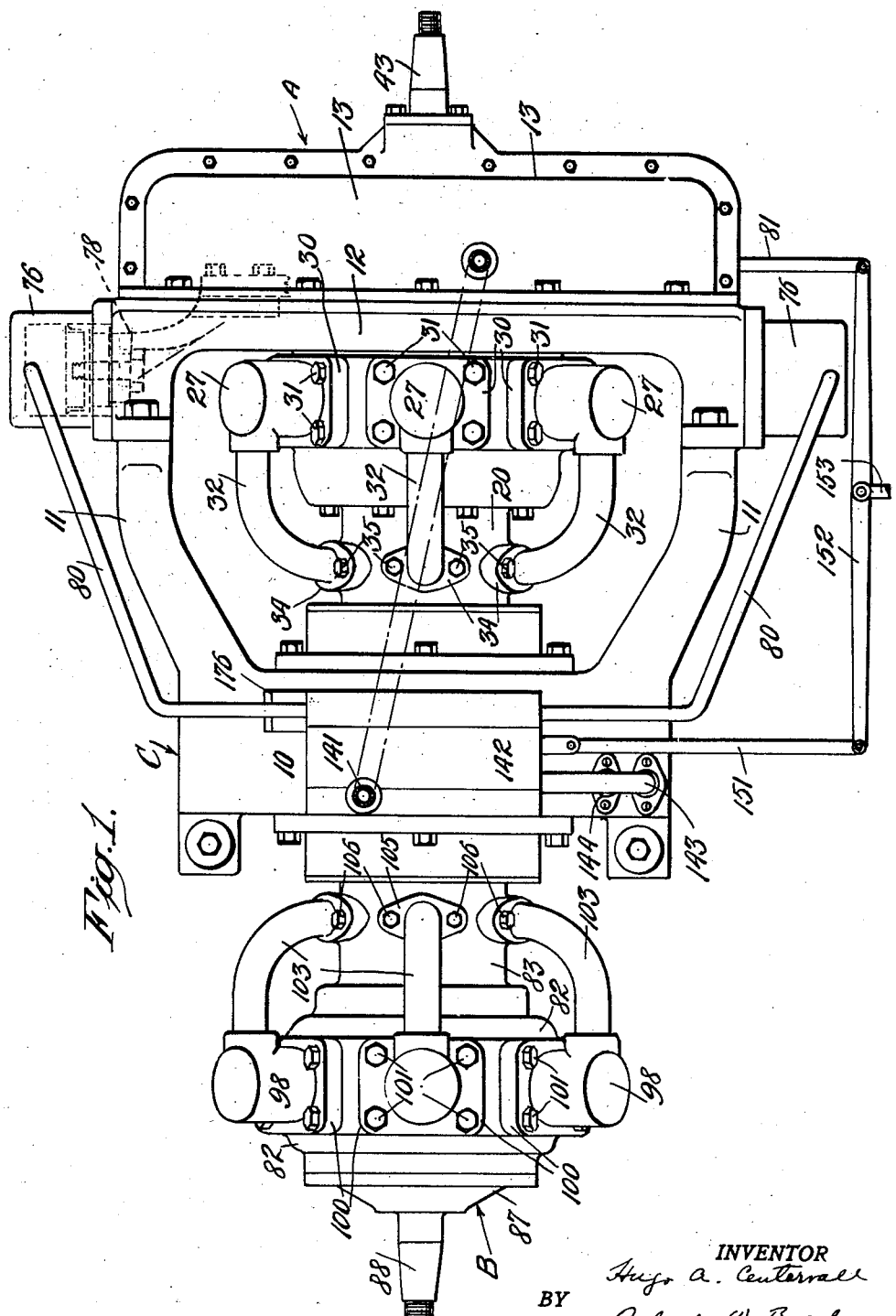

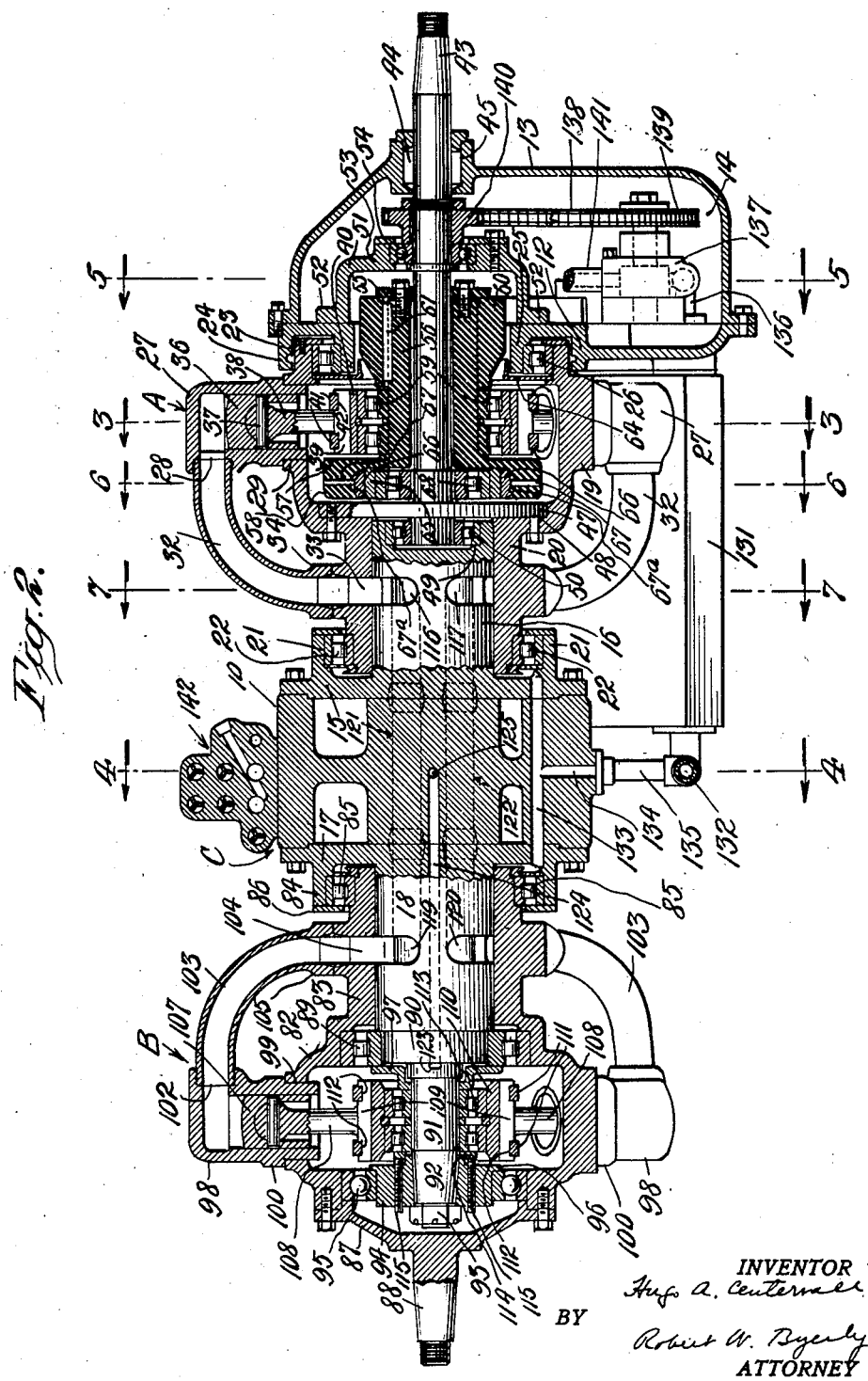

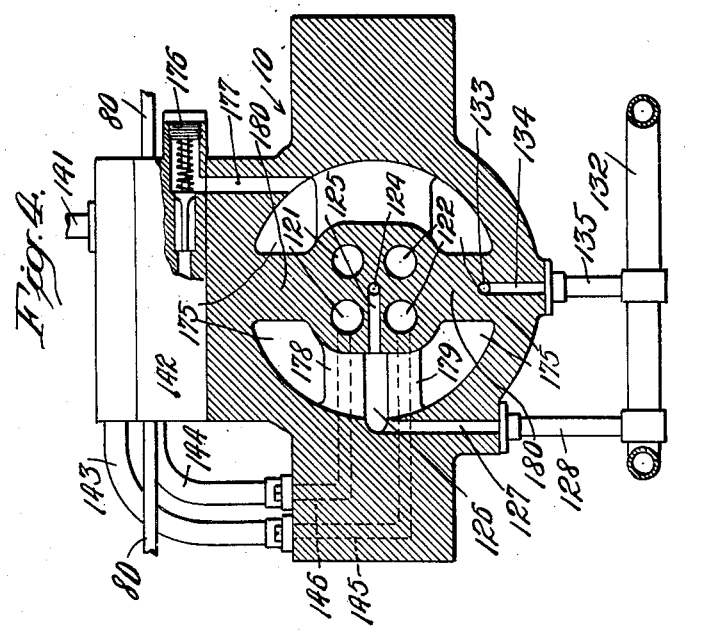
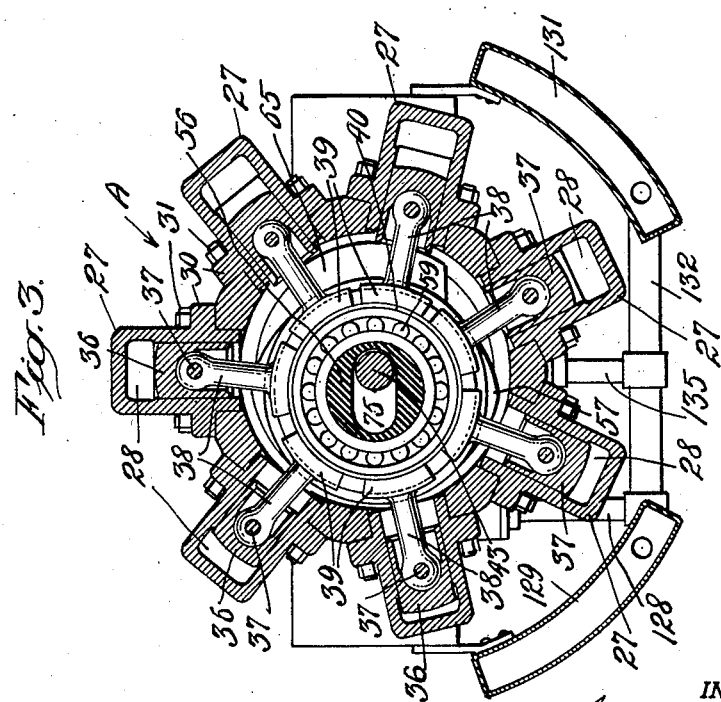

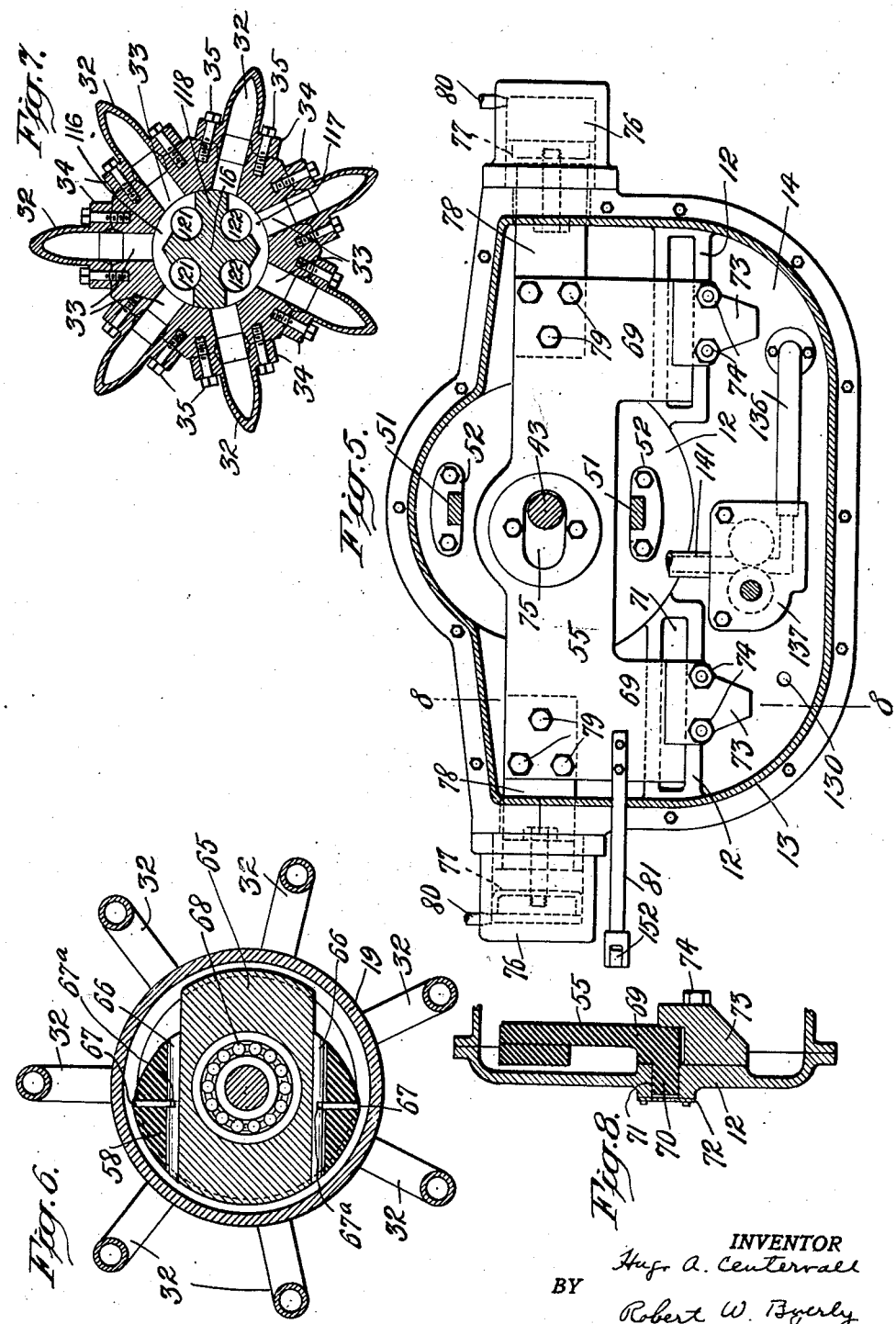

2,086,535

UNITED STATES PATENT OFFICE 2,086,535

HYDRAULIC VARIABLE SPEED POWER TRANSMITTING MECHANISM

Hugo A. Centervall, New York, N. Y., assignor to Manly Corporation, New York, N. Y., a corporation of Delaware Application July 11, 1931, Serial No. 550,198

11 Claims. (Cl. 60—53)

This invention relates to hydraulic mechanism for the transmission of power at variable speeds and this application is in part a continuation of my co-pending application, Serial No. 368,706, for Hydraulic variable-speed power-transmitting mechanisms, filed June 5, 1929.

The use of hydraulic transmission devices, wherein use is made of a power driven pump for forcing a current of liquid into the cylinders of a motor operatively connected with the driving shaft of whatever mechanism is to be operated, control of the speed of the driven member being effected by varying the pump stroke is becoming increasingly widespread.

Great difficulty has been encountered, however, in the operation of known hydraulic transmission devices due to overheating caused principally by friction of the parts and the frictional resistance offered to the flow of the liquid, generally oil, through the various channels, ports and valves. This heat, generated from these or any other causes, has resulted in serious impairment of the efficiency of the devices, both because of the deteriorating effect upon the oil and the changing of its viscosity and further because of the expansion of the metal parts, which are necessarily close fitting, causing binding of the parts, or leakage, or both. The amount of such overheating is recognized as limiting the capacity of a machine of this class to transmit power continuously.

It is with the above facts in view that I have devised the present mechanism which has for its general object the provision of an improved hydraulic power transmitting mechanism of high efficiency.

A more specific object is to provide a device so constructed that the rotating parts are in direct contact with the atmosphere, thus greatly facilitating the dissipation of any heat that is generated.

Another object is the provision of liquid recovering, replenishing and circulatory means which not only makes for economy of operation, but utilizes the air currents set up by the rotating parts to cool the liquid used in this system.

A further object is to provide an improved means of supporting the variable stroke crank element.

A still further object is to provide a device with an improved arrangement of parts, which permits each cylinder to be separately demounted and which permits the assembly of all the parts with a minimum of time and effort.

Other objects and novel features of this invention will be pointed out and clearly defined in the claims at the close of this specification.

In the drawings:—

Fig. 1 is a top plan view of a complete hydraulic transmission mechanism constructed in accordance with my invention.

Fig. 2 is a central vertical longitudinal sectional view.

Fig. 3 is a vertical cross-sectional view through the pump unit, the view being taken along the line 3—3 of Fig. 2.

Fig. 4 is a similar view taken through the stationary intermediate member located between the pump and motor units, on the line 4—4 of Fig. 2.

Fig. 5 is a vertical section taken on the line 5—5 of Fig. 2, illustrating part of the slidable pump stroke varying member in detail.

Fig. 6 is a detail cross-section on the line 6—6 of Fig. 2, showing the mounting for one end of the variable stroke crank element of the pump.

Fig. 7 is a cross-section on the line 7—7 of Fig. 2.

Fig. 8 is a vertical section on the line 8—8 of Fig. 5.

Fig. 9 is a vertical section, partly schematically arranged, showing an improved and alternative form of fluid collection, replenishment and circulatory system.

Fig. 10 is a detailed view of a valve device.

Fig. 11 is a top plan view of guide means for the valve like that shown in Fig. 10.

Referring more particularly to the drawings, I have shown the device as comprising, broadly, a pump unit A, a motor unit B indirectly driven thereby, and an interposed stationary member C provided with means for establishing and controlling communication between the pump and motor units.

The machine is carried by a stationary frame including a member 10 from which extend preferably diverging arms 11 secured to a transverse end plate 12 outwardly of which is located a casing member 13 secured thereto and cooperating therewith to define a sump 14. Secured against one face of the member 10 and located between the arms 11 is a member 15 formed centrally with a cylindrical or trunnion-like member 16. Secured to the opposite side of the member 10 is a similar member 17 formed centrally with a trunnion-like member 18 and which constitutes the support for the motor unit B.

The pump unit A is carried by the members 12 and 15 and comprises a hollow rotor 19 of cylindrical shape having a hub portion 20 surrounding the trunnion member 16 and located within an outstanding flange 21 forming part of the member 15, roller bearings 22 of any suitable type being located between the hub and the flange.

The opposite end of the rotor 19 is received within a recess 23 in the face of the end plate 12, this recess being defined between a flange 24 and a cylindrical bearing hub 25. An appropriate roller bearing structure 26 is interposed between this end of the rotor and the hub 25. By this mounting, the rotor is adequately sustained by the stationary parts for rotation with respect thereto.

The rotor assembly further includes a series of radial cylinders 27 which are closed at their outer ends except for ports 28 and which have their inner ends fitting into openings 29 in the rotor 19. These cylinders are preferably individually removable and are consequently represented as having attaching base portions 30 secured on the periphery of the rotor 19 as by cap screws 31. Removably secured to the sides of the cylinders at the ports 28 therein are hollow arms 32 which constitute conduits and which have their other ends secured to the hub 20 at ports 33 therein, suitable packing being used at these joints to make them fluid tight. These hollow arms, like the cylinders, have attaching portions 34 secured to the hub as by cap screws 35. Any desired number of cylinders, together with the corresponding arms 32, may be provided. In the preferred form I have shown the pump A as having seven cylinders.

Slidable within the cylinders 27 are pistons 36 connected by wrist pins 37 to connecting rods 38 which have their inner ends enlarged to form shoes or base portions 39. These shoes 39 are disposed against the outer periphery of a ring 40 to which they are held by means of a pair of rings 41 located at opposite sides of the series of connecting rods and fitting within grooves 42 in the shoes 39. The shoes 39 may slide circumferentially with respect to the ring 40 for automatically accommodating themselves to the various conditions brought about by movement of the stroke varying means to be described.

The means for driving the pump A comprises a drive shaft 43 passing through a stuffing box 44 located in a pocket 45 in the casing 13. Adjacent to the inner end of this shaft is a disk 47 preferably formed integrally with the shaft 43 and which is secured to the rotor 19 at the face of the hub 20 thereof, as shown at 48. The inner end of the shaft 43 extends into a recess 49 in the free end of the trunnion member 16, roller bearing assemblies 50 being interposed between the shaft 43 and the cylindrical wall of the recess. The shaft 43 is additionally supported by a spider 51 which has its legs terminating in attaching feet 52 secured to the outer face of the end plate 12 and which has a hub portion 53 containing a ball bearing assembly 54 surrounding the shaft.

The means for controlling the reciprocation of the pistons 36 to whatever extent is desired, is an important feature of my invention. It may be broadly described as a crank pin mounted so that it may be moved transversely of the machine to determine the axis about which the piston assembly rotates. This mechanism comprises a hollow laterally movable crank pin 56 supported on its front end by a relatively large and rugged platelike member or slide 55 and supported on its inner end upon the drive shaft 43 by intermediate means later to be described. The position of this mechanism determines the length and direction of the stroke of the pistons 36. The crank pin 56 and the upper central portion of the slide 55 are formed with aligned horizontally elongated slots 75 through which the drive shaft 43 passes. These slots 75 are of such size and shape as to permit the maximum desired lateral movement of the crank pin 56 and the slide 55 without bringing the inner peripheries of said slots into contact with the drive shaft 43.

The sleeve 56 terminates on one end in a somewhat disk-like vertically elongated portion 57 having spaced overhanging flanges 58 at the top and bottom and located adjacent the disk 47. Each flange 58 is fitted with a guide 66, pinned as at 67 in the longitudinal slots 67a. Since the opposing faces of the flanges 58 and the guides 66 are similarly curved, these parts may rock slightly with respect to one another to permit a slight adjustment between the parts, but the flanges 58 and the guides 66 will be held firmly in place as regards any motion transverse of the machine. The guides 66, which may be made of bronze or any other suitable material, are slidably mounted on a relatively stationary plate 65 which is supported by a roller bearing assembly 68 mounted on the drive shaft 43.

Adjacent the disk-like portion 57 the crank pin 56 carries a roller bearing structure 59 located within the confines of and engaging the ring 40 which carries the connecting rods for the pistons 36. This roller bearing assembly is held in place by hub 60.

The front end of the crank pin 56 is supported by the hub 60 formed on the slide 55 and keyed as at 61. The inner end of the hub 60 is preferably tapered toward the axis so as not to interfere with a retaining ring 64 which is carried by the member 19 and which holds the above described roller bearing assembly 26 in place.

The slide 55 is movably mounted against the end plate 12 and is provided with downward extensions 69 terminating at their lower ends in laterally arranged lugs or feet 70 slidably fitting within elongated slots 71 in the end plate 12, these slots being covered by plates 72. The downward extensions 69 are preferably widely spaced so as to resist any tendency to be angularly displaced. The slide 55 is held in place against the end plate 12 by the angled retaining members 73, secured as at 74 to the end plate 12 and overlying the outer faces of the extensions 69. The lugs 70, the slots 71 and the members 73 cooperate to permit the slide 55 to be easily moved laterally of the machine but to hold said slide firmly in position as regards any other displacement. Suitable stopping means of any sort may be employed to limit the lateral motion of the slide 55 and of the parts moved by it.

It will be seen that I have provided a laterally slidable crank mechanism firmly supported on both its ends, said support coming at either side of the center of pressure of the pump piston assembly. It will also be noted that the support afforded by the assembly cooperating with the disk-like portion 57 and by the feet or lugs 70 of the slide 55 form a final supporting means of triangular relation to each other, giving in effect a final three point suspension.

The motor unit B includes a hollow rotor member 82 having a hub portion 83 rotatable about the trunnion-like member 18 and located within an over-hanging flange 84 on the member 17, a roller bearing structure 85 being interposed between the hub and the flange. A retaining plate 86 for the roller bearing is mounted on the end of the flange. The inner periphery of the plate 86 is hollowed out to contain a felt washer to prevent leakage of any oil which may get past the bearing 85. The other or outer end of the rotor 82 is closed by a plate 87 secured thereto, this plate carrying a stub shaft 88 which constitutes the driven shaft of the machine. As it is necessary to support the rotor 82 at a plurality of points, I have shown its intermediate portion as containing a roller bearing assembly 89 engaging upon a reduced step 90 on the trunnion like member 18. The bearing assembly 89 is held in place by the retaining ring 97 cooperating with the rotor 82. Beyond this step 90 the trunnion member is reduced to form an eccentric spindle 91 upon the preferably tapered end 92 of which is secured, as by a nut 93, an eccentric collar 94 upon which is mounted a ball bearing assembly 95 engaging against and supporting the outer end of the rotor 82. The eccentric collar 94 has a flange 96 at its inner end which cooperates with the plate 87 to retain the ball bearing assembly in place.

The motor unit further includes a plurality of cylinders 98 having their outer ends closed except for ports 102 and having their inner ends fitting within openings 99 in the periphery of the rotor 82. As these cylinders are, like the pump cylinders, intended to be individually detachable, they are shown as having attaching portions 100 secured to the outer periphery of the rotor by the cap screws 101. Detachably mounted on the sides of the cylinders 98 at the ports 102 therein are curved hollow arms 103 constituting conduits, and these arms are secured to the hub portion 83 at ports 104 therein. The arms have attaching portions 105 secured as by cap screws 106.

Slidable within the cylinders 98 are pistons 107 carried by connecting rods 108 which have their inner ends provided with shoes 109 slidably bearing upon a ring 110 and held in place by a pair of retaining rings 111 at opposite sides of the piston rods and seated within grooves 112 in the shoes. Within the ring 110 is a roller bearing structure 113 engaged about the spindle 91. This roller bearing assembly is prevented from displacement in one direction by the ring 97 and in the other direction by a ring 114 engaged by screws 115 threaded through the collar 94 and accessible for adjustment upon removal of the plate 87.

In order that there may be proper timed communication between the pump A and the motor B, the trunnion member 16 is formed with a pair of ports 116 and 117 separated by a transverse partition 118, these ports being adapted to register with the ports 33 in the hub 20 of the pump rotor 19. Similarly the trunnion member 18 is formed with ports 119 and 120 separated by a corresponding partition member and adapted to register with the ports 104 in the hub 83 of the motor rotor 82. Formed through the central member 10 and through the trunnion members 16 and 18 are aligned longitudinally extending passages 121 and 122, the former communicating at their ends with the ports 116 and 119 and the latter communicating at their ends with the ports 117 and 120. The members 16 and 18 with their passages and ports constitute and will be claimed as valves. The portion of the central stationary member 10 containing the passages 121 and 122 is supported by the webs 180 (see Fig. 4) of elliptical cross section and by the smaller webs 178 and 179, thus forming intercommunicating chambers 175. It will be noted the webs 178 and 179 are substantially in line with the passages 121 and 122 respectively, allowing other fluid connections to be made with these passages as will be later explained.

The operation of the hereinbefore described parts is as follows:

The drive shaft 43 is connected to any suitable source of power and in this embodiment is supposed to be rotating in clockwise direction. As the drive shaft 43 is rotated, it carries with it the plate 47 which in turn rotates the pump rotor 19 and the cylinders 27 and the arms 32 which are part of the pump rotor assembly. Obviously, during each revolution of the rotor, the ports 33 at one time will be in communication with the port 116 and at another time with the port 117 of the member 16. As the cylinders 27 rotate they carry with them the pistons 36 and the connecting rods 38. On the exhaust stroke the shoes 39 will be held in place against the ring 40 by the pressure exerted upon them by the fluid in the cylinders 27 through the pistons and connecting rods and on the suction stroke, the shoes 39 will be held in place by a similar but lower pressure, or, if such pressure be insufficient, by the rings 41. The ring 40 will also rotate on the bearing assembly 59. The only movement of the shoes 39 on the ring 40 will be the small amount of sliding necessary to compensate for the varying angularities of the connecting rods at the various points in its path of travel.

If the crank pin 56 is in its middle position or so that its center coincides with the axis of the rotor 19, the cylinders 27 and the pistons 36 will obviously be rotating about a common center and there will be no reciprocation of the pistons. The pump A is then in its zero or no stroke position and no fluid will be pumped by it.

If the slide 55 be shifted to the left as viewed in Fig. 5, it will carry with it the crank pin 56. The center of rotation of the pistons 36 will no longer coincide with the axis of the rotor 19 but will be to the left of it, so that the pistons 36 will be reciprocated in the cylinders 27 and will perform one complete intake stroke and one complete exhaust stroke for each revolution of the rotor 19. The length of the stroke will depend upon the distance the slide 55 and the crank pin 56 has been shifted. In the present embodiment, with the crank pin shifted to the left, the pistons 36 will be on their inward or suction strokes in all of the cylinders 27 whose corresponding hollow arms 32 have their ports 33 in communication with the port 116. Fluid will, therefore, be sucked up through the port 116, through the ports 33, the ports 28 and into the cylinders 27. At the same time the other pistons 36 will be on their outward or exhaust stroke in all cylinders whose corresponding ports 33 are in communication with the port 117, so that fluid under pressure will be forced out of the cylinders 27, through the ports 28, the arms 32 and the ports 33 into the port 117 from whence it will travel to the motor B through the passages 122. Such pressure fluid will pass through the member 16, the member 10 and the member 18 into the port 120.

The operation of the motor B may be broadly described as similar but opposite to that of the pump A. Pressure fluid entering the port 120 will enter all the ports 104 that are then in communication with it and will travel through the corresponding arms 103 and the ports 102 into the outer ends of the cylinders 98. Pressure will thus be exerted upon the pistons 107, the connecting rods 108, the ring 110, the bearings 113 and will react against the spindle 91. As this spindle is positioned eccentrically to the axis of the rotor 82, the rotor will be caused to turn in a clockwise direction and the driven shaft 88 will thus be operated. As the stroke of the motor pistons 107 is fixed, the speed of the rotor 82 will depend upon the quantity of oil supplied by the pump A and as this may be varied from zero to maximum, the speed of the rotor 82 may similarly be varied. At the same time, the pistons 107 will be on their outward or exhaust stroke in all the cylinders 98 whose corresponding ports 104 are in communication with the port 119, so that fluid in these cylinders will be expelled, passing through the passages 121 and being returned to the port 116 where it will again be sucked up by the cylinders 27 and then re-circulated through this channel on the downward stroke of the pistons.

If the slide 55 be moved through the zero position and to the right as looked at in Fig. 5, it will move with it the crank pin 56 so that the center of rotation of the pump piston assembly will be to the right of the axis of the rotor 19. The entire operation of the pump A will then be reversed, pressure fluid being forced into the port 116, through the passages 121, into the port 119, where it will enter the ports 104 in communication with it and will cause the rotor 82 to rotate in a counter clockwise direction. The direction of rotation and the speed of the rotor 82, therefore, depend entirely upon the position of the crank pin 56.

Any suitable means may be employed for shifting the slide 55 and hence of moving the above described crank pin mechanism, as for example, a screw and nut device of well known design. As illustrated herein I have shown hydraulic power means for accomplishing this result, and have provided at each side of the machine and suitably secured to the end plate 12 cylinders 76 closed at their outer ends and containing pistons 77 connected to plates 78 secured at 79 to the slide 55. Fluid pressure conducting pipes 80 enter the outer ends of these cylinders. Fluid under pressure for operating these cylinders 76 may be secured from any preferred source, as from a separate pump, and controlled by any suitable valve control device. I prefer, however, to obtain pressure fluid from the main or working circuit of the transmission device and this is accomplished through and controlled by the valve mechanism located in the valve block 142. This valve block is the same as that shown in Figs. 8 to 12 of Letters Patent of the United States granted to Charles M. Manly on November 28, 1916, No. 1,206,453, and need not be described here in detail, but contains, among others, valves for continuously furnishing pressure fluid to an adjusting valve by which the admission of pressure fluid to either of the cylinders 76 may be controlled. For controlling the adjusting valve I have shown a floating lever device comprising a link 151 (see Fig. 1) attached on one end to the stem of the adjusting valve and on its other end movably attached to the lever 152. The other end of lever 152 is movably connected to the rod 81 which in turn is rigidly fastened to the slide 55, projecting through a passage in the casing 13. Means for operating the floating lever device is indicated at 153 in Fig. 1. In operation of this control, an impulse applied to the lever 152 by means of the element 153 will cause the rod 151 to be pushed in or pulled out as the case may be. In one instance the adjusting valve will be so moved as to permit pressure fluid to pass through one of the pipes 80 into one of the cylinders 76 where it will react against the piston 77 and shift the slide 55 and the crank pin 56 in one direction. When the rod 153 is moved in the opposite direction, pressure fluid will be permitted to pass through the pipe 80 into the other cylinder 76 and the slide 55 and crank pin 56 will consequently be moved in the opposite direction. In either direction, the floating lever device acts as a follow-up to shut off the pressure fluid when the slide 55 has been moved the amount corresponding to the distance the element 153 has been moved.

In devices of this class, leakage is bound to occur as it is a physical impossibility to have the working parts fit so snugly as to entirely prevent it. Consequently, I have provided for collecting and returning such leakage, and, for convenience, I shall use the term "leakage circuit" to broadly designate the mechanism through which this is accomplished.

One embodiment of such a leakage circuit is shown in Figs. 1, 2, 4, and 5. I provide cooling tanks 129 and 131 which are connected for free intercommunication by the pipe 132 and which are secured to the stationary parts of the machine in any suitable manner. These tanks are preferably located at a point relatively low with respect to the pump A and the motor B so as to facilitate the collection of leakage as will be later described. They are also preferably placed near the outer ends of the rotating pump cylinders 27. They may be of any desired and practical size and shape, but I prefer to make them large enough to contain substantially more fluid than the leakage fluid collected therein, so that there will be a reserve supply at all times for replenishing the main fluid system and also so that fluid may be temporarily halted therein, thus allowing it to be cooled by the air currents stirred up by the rotating cylinders 27. As shown these tanks are of somewhat curved cross section, enabling a greater area to be positioned close to the path of the rotating cylinders. They may be made of any suitable material, but are preferably made of aluminum or thin copper, because of the heat conducting properties of these metals and to reduce weight. Radiating fins may be added if desired.

For collecting the leakage from the motor B, I provide the member 18 with a passage 123 leading to a longitudinal passage 124 which extends into the member 10 to about its middle point. This passage 124 connects with a transverse passage 125 whose open end terminates in an outlet opening 126 between the webs 178 and 179. Fluid discharged into the horizontal space between webs 178 and 179 is free to pass into the intercommunicating chambers 175 in the member 10. When fluid accumulating in the chambers 175 reaches the level of the overflow duct 127 it will pass through this duct into the pipe 128 and then into the pipe 132 which is connected with tanks 129 and 131. The overflow duct 127 may be located at any desired point below the passage 125, but I prefer to place it at about the level of the upper surface of web 179 so that considerable fluid may accumulate in the chambers 175, absorbing and carrying away heat from the member 10. The level of the fluid in the rotor casing 82 is determined by the position of the passage 123.

Fluid leaking from around the members 16 and 18 on their ends nearest the member 10 will pass through the aligned passages 133 in the members 15, 10 and 17 and will drain through a vertical passage 134 into a vertical pipe 135 connected with the horizontal pipe 132 from whence it is free to flow into either of the tanks 129 and 131.

Fluid leaking from around the valve member 16 at its end nearest the pump cylinders 27 will leak through passages (not shown) in the plate 47 and into the rotor casing 19. Fluid leaking from the inner ends of the pump cylinders 27 will find its way around the crank pin mechanism and into the rotor casing 19. Fluid thus accumulated in the rotor casing 19 will overflow through the open spider 51 into the space 14 at the bottom of the casing 13 from which it passes through a passage 130 into the tank 129.

It will be observed that all of the fluid leaking from the various parts of the main or working circulatory system is eventually accumulated in the cooling tanks 129 and 131.

Positive means for returning this leakage is provided and comprises a pump 137 driven from the drive shaft 43 by some suitable means such as a chain 138 trained about a sprocket 139 on the shaft of the pump 137 and about a sprocket 140 mounted on the drive shaft 43. This pump may be of any preferred type and is here illustrated as a gear pump of a well known type and is made of a capacity large enough to supply at all times an excess of fluid over and above the amount needed to replenish the leakage in the main or working circulatory system. The suction side of the pump 137 is connected through a pipe 136 with the tank 131. The pressure or discharge side of the pump 137 is connected to a pipe 141 through which fluid under pressure is conveyed to the valve block 142. As hereinbefore noted, this valve block may be the same as that shown in the patent to Manly, No. 1,206,453. It contains valve mechanism through which fluid delivered to it by the pump 137 is admitted to the main circulatory system to make up for the fluid which has leaked out and maintain the volume of fluid therein substantially constant. Pipes 143 and 144 connect the valve distributing mechanism in the valve block with the passages 145 and 146 respectively in the member 10, the latter passages passing through the webs 179 and 178 and communicating with the passages 122 and 121 respectively of the main circulatory system. The replenishing fluid will be fed alternatively into passages 121 or passages 122, that is into whichever pair of these passages is at the time serving as the low pressure or return passages of the main circulatory system. The setting of the spring on the "blow-off" or exhaust valve 176 in the valve block determines the pressure built up by the pump 137 and hence the maximum pressure maintained in the low pressure passages of the main circulatory system; in practice it has been found that the best results are obtained when this pressure is kept at higher than atmospheric pressure, the exact amount varying with individual installations and conditions.

The excess fluid delivered to the valve block 142 by the pump 137 and not required for replenishing the main circuit or other purposes will be discharged through the blow off valve 176 through the passage 177 in the member 10 and will enter one of the intercommunicating chambers 175 whence it will return to the tanks 129 and 131 in the manner hereinbefore described.

Another and improved embodiment of my leakage circuit is shown in Figs. 9, 10 and 11. It embodies in novel manner the preferred features of a positive pressure replenishing system, broadly similar to that previously described, and of a gravity replenishing system whereby replenishment is accomplished through inwardly opening check valves acting under suction from within the main circulatory system and from the weight of the column of fluid in an elevated reserve tank.

The pump 137 and the method of driving it are the same as hereinbefore described. The pressure or delivery side of this pump is connected to the pipe 241. Located on the top face of and suitably secured to a modified form of the member 10 is a member 242 in which are formed a pressure chamber 243 and a reservoir 244, closed at their tops by the cover 245 in such a manner as to form fluid tight joints with the walls of the pressure chamber and of the reservoir. Fluid under pressure delivered by the pump 137 passes through the pipe 241 and enters the pressure chamber 243 through the port 246 which is preferably placed near the top of one of the walls of the pressure chamber so as to prevent fluid draining out of the chamber when the pump 137 is stopped. Located in the bottom of the chamber 243 are two check valves 246 and 247. Valve 246 is connected with the passage 248 in the modified form of the member 10, this passage intersecting and connecting the pair of passages 122 of the main circulatory system. Similarly valve 247 is connected with a pair of passages 121 through the passage 249. The check valve 246 is designed to open and admit fluid from the pressure chamber whenever the pressure in the chamber 243 exceeds that in the passage 248 and hence in the passages 122, but when the pressure in the passage 248 exceeds that in the chamber 243 the valve 246 will close and prevent any fluid passing into the chamber 243. Valve 247 operates in the same manner.

Controlling the pressure in the chamber 243 is an exhaust or "blow-off" valve 250 located in the wall of the chamber adjacent the reservoir 244. This valve is preferably placed near the top of the chamber 243 so that any air that enters may rise and be quickly expelled. As shown, the valve 250 is of the piston type and is held on its seat by a spring 251 mounted on a suitable support as 252. The spring 251 may be made adjustable or may be set for any desired pressure. When the pump 137 is in operation the force placed on the valve 250 by the spring 251 determines the pressure maintained in the pipe 241 and the chamber 243 and hence the minimum pressure in passages 248 and 249 and the passages 121 and 122 of the main circulatory system. Pressure fluid will, therefore, replace leakage in the main circulatory system and maintain in it a predetermined pressure. When the pump A is at its no stroke position, replenishing fluid may be supplied simultaneously to both of the pairs of passages 121 and 122 and any deficiency of fluid in the main circulatory system will be quickly made up. When the pump A is given stroke the pressure generated by it will exceed that in the chamber 243, under ordinary conditions, and the check valve 246 or 247 will cut off communication between the chamber 243 and whichever of passages 121 or 122 is then constituting the path of travel of the high pressure fluid from the pump A to the motor B; but leakage will be replenished through whichever of these passages 121 or 122 is then constituting the low pressure or return side of the main circulatory system. When the pumps A and 137 are stopped, the chamber 243 will be completely filled with fluid. If leakage occurs in the main circulatory system as the machine stands idle, one or both of the valves 246 and 247 will open under the weight of the fluid in the pressure chamber 243 and replenishing fluid will be admitted into the main circulatory system. This device, therefore, operates as a positive pressure leakage replenishing mechanism when the pumps A and 137 are in operation and as a gravity replenishing mechanism when the machine stands idle.

Excess fluid not needed to replace leakage will be discharged through the valve 250 into the reservoir 244. Located near the opposite end of the reservoir is an overflow wall 253 which may be of any desired height but should be low enough to permit the easy flow of fluid between its top and the cover 245. Located between the walls 253 and 255 is a compartment 254 which is connected with a passage 256 in the modified form of the member 10. This passage 256 leads into a cooling tank 257, here shown as secured to the lower face of the member 10. This tank is preferably placed low enough to facilitate the collection of leakage and adjacent the rotating pump cylinders 27 so that it may be cooled by the air currents generated by them. Positioned below the passage 256 in the tank 257 is a curved baffle plate 258 which retards the speed of fluid entering the tank through the passage 256 and thus prevents turbulence. An air vent 259 is located near the top of one wall of the tank 257. A strainer 261 is placed in the tank at an angular position, one of its ends being supported by the baffle plate 258 and the other end resting in the opposite bottom corner of the tank 257. The angular position of the strainer makes it possible to have all incoming fluid enter the tank above the strainer while maintaining a good head of fluid above the port 262, and also allows the fluid to pass through the strainer slowly and gradually, thus eliminating both dirt and air from the fluid. Connected to the port 262 is the pipe 263 which leads to the suction or intake side of the pump 137.

Leakage will be collected in the manner already described, such leakage being conducted into the tank 257 through suitable connections, one of which is indicated at 260 which is a port in the wall of the tank 257 connected to a pipe, not shown, connected in turn with the space 14 in the casing 13.

The circulation of the fluid will be clear from the foregoing description. The speed of the fluid discharged through the valve 250 will be checked by the valve support 252 and by the fluid already in the reservoir. If any air has become mixed with the fluid, de-aeration will begin to take place in the reservoir and will continue as the film of fluid flows down the wall 253 and the passage 256.

In some instances it is desirable to maintain one or both rotor casings completely filled with fluid as this retards leakage, particularly when the machine stands idle, and assures proper lubrication of all parts at starting. A serious objection to this in other devices of this class has been that the rotating parts churned the fluid and generated considerable heat. As the rotor casings in my device revolve with the other rotating parts, the fluid in them is held against them by centrifugal force and revolves with the rotor and with the other rotating parts. The only churning effect, therefore, is the small amount caused by the reciprocation of the pistons and connecting rods and in actual practice this has been found to be negligible. In my improved leakage circuit I have, therefore, shown means for maintaining the motor rotor casing 82 completely filled.

Located in the bottom of the reservoir 244 is an opening 264 to which is connected a vertical passage 265 which leads into a chamber 266 formed in the modified form of the member 10. Another vertical passage 267 leads from the bottom of the chamber 266 and is connected with the longitudinal passage 124, Figs. 2 and 9, which passes through the member 10 and the member 18 and connects with the passage 123, one end of which is open to the interior of the rotor casing 82. Fluid in the reservoir 244 will flow through the passage 265, into the chamber 266, the passage 267, the passages 124 and 123 and into the rotor casing 82, completely filling all of them. Leakage occurring from the inner ends of the cylinders 98 and from the end of the valve member 18 nearest them will cause a slight pressure in the rotor casing, causing the excess fluid to rise through the various communicating passages into the reservoir 244 and from there it will return to the tank 257 in the manner already described.

Either or both of the pump and motor units disclosed herein will function as either a pump or motor, with a variable or fixed stroke as desired, and either unit may be used in connection with two or more of the other units, suitable changes for this purpose being made in the intercommunicating means.

Having thus described my invention, I claim:

1. In a hydraulic power transmission apparatus, the combination of relatively and independently rotatable pump and motor units, a stationary valve device supporting and establishing communication therebetween, said units and said valve device being included in a liquid circulation system, means for collecting liquid leaking from said liquid circulation system, and means for cooling the collected liquid by utilizing the currents of air produced by said rotating members.

2. In a hydraulic power transmission apparatus, the combination of pump and motor units at least one of which comprises a plurality of rotating cylinders exposed to free air and independently rotatable with respect to said other unit, a main fluid circuit for connecting said pump and motor, an auxiliary fluid circuit comprising means for collecting fluid leaking from said main circuit, means for supplying make-up fluid to said main circuit from said fluid-collecting means, and means for cooling the fluid in said auxiliary circuit by utilizing air currents set in motion by said rotating cylinders.

3. In a hydraulic power transmission device, the combination of a main fluid circulatory system, comprising pump and motor units at least one of said units having a number of radially arranged rotary cylinders freely exposed to the atmosphere and independently rotatable with respect to said other unit, a secondary fluid circuit including means for collecting leakage fluid and returning it to said main circuit, and a storage tank in said secondary circuit located in a position to be fanned by the air currents set up by said rotary cylinders.

4. In a hydraulic power transmission device, a liquid circulation system comprising rotary pump and motor units, a central inter-communicating member having a pair of opposed trunnion-like valve members projecting therefrom interposed between said pump and motor units respectively, at least one of said pump and motor units including a set of rotatable radial cylinders adapted for rotation independently of the other unit and having pistons operating within the inner ends thereof and having their outer ends closed, each of said trunnion-like valve members having a plurality of ports, and each of said cylinders having separate means adapted to rotate with said cylinders and to communicate alternatively with either of said ports, said cylinders and their respective communicating means being supported so that they are directly exposed to the air at all times.

5. In a hydraulic power transmission device, comprising a main circulatory system including pump and motor units and inter-communicating valve, a liquid storage chamber, means for returning liquid leaking from said main circulatory system to said storage chamber, a pressure chamber communicating with said storage chamber, means for forcing liquid from said storage chamber to said pressure chamber, a plurality of passages communicating between said pressure chamber and said valve and an overflow tank communicating with said pressure chamber, said overflow tank having a lateral partition extending part way to the top of said chamber, a passage communicating from one side of said partition with the crank case for said motor, and a second passage communicating from the other side of said partition with said storage tank.

6. In a hydraulic transmission having a fluid circuit and comprising a pump unit and a motor unit, one of said units having a rotary cylinder element provided with a rotary valve chamber in axial alignment therewith, reciprocating pistons in the cylinders of said cylinder element, a stationary member positioned adjacent said one of the units, a cylindrical valve element extending from said stationary member and entering said valve chamber, a crank pin to which said pistons are operatively connected, and means for supporting said crank pin entirely upon said cylindrical valve element.

7. A hydraulic power transmission apparatus comprising a central stationary member provided with a pair of opposed trunnion-like valve members, and independently rotatable pump and motor units mounted for rotation about said trunnion-like valve members, each of said units comprising a rotor provided with a plurality of radial cylinders each having a piston reciprocating therein, the trunnion-like valve member for said motor unit supporting bearings for the rotor of said motor unit, a common crank pin for the pistons of said motor unit also supported on said trunnion-like valve member, means connecting said valve members to join said pump and motor units in a closed fluid circuit, and means for varying the stroke of the pistons in said pump unit in order to control the speed of the motor unit.

8. In a hydraulic transmission having a fluid circuit and comprising a pump unit and a motor unit, one of said units comprising a plurality of cylinders radiating from an interior space, pistons reciprocable in said cylinders, and a rotary element provided with an axial chamber to which said cylinders are connected, a cylindrical valve element entering said axial chamber and conveying fluid to and from said unit, and an auxiliary fluid circuit for collecting and returning leakage fluid, said auxiliary circuit comprising means embodied in said valve element for conveying outwardly from the interior space fluid that has leaked past the pistons into said space.

9. In a hydraulic transmission having a main fluid circuit and comprising a pump unit and a motor unit, one of said units having a cylinder element independently rotatable with respect to the other of said units, said cylinder element being provided with a valve chamber in axial alignment therewith and having cylinders exposed to free air, a cylindrical valve element entering said valve chamber and conveying fluid from said main circuit to and from said unit, and an auxiliary fluid circuit comprising fluid connection with the interior of said rotary cylinder element for conveying fluid inwardly and outwardly therefrom, said fluid connection being embodied in said valve element.

10. In a hydraulic transmission having a fluid circuit and comprising a pump unit and a motor unit, one of said units having a rotary element including cylinders exposed to free air, a stationary member positioned adjacent said unit, a valve element carried by said stationary member and establishing fluid connection with said rotary element, a fluid-leaking running joint between said valve element and said rotary element, unitary means for enclosing said running joint and for collecting fluid leaking through said joint, and means for returning fluid so collected to the fluid circuit.

11. In a hydraulic transmission having a fluid circuit and comprising a pump unit and a motor unit, one of said units having a rotary cylinder element provided with a rotary valve member in axial alignment therewith, reciprocating pistons in the cylinders of said cylinder element, a stationary member positioned adjacent said one of the units, a valve element supported on said stationary member and coacting with said valve member to control the flow of fluid for said cylinders, a crank pin to which said pistons are operatively connected, and means for supporting said crank pin entirely upon said valve element.

HUGO A. CENTERVALL.